UNITED STATES PATENT OFFICE.

EDWARD I. BRADDOCK, OF MEDFORD, MASSACHUSETTS.

INSECTICIDE.

SPECIFICATION forming part of Letters Patent No. 624,617, dated May 9, 1899.

Application filed September 23, 1898. Serial No. 691,710. (No specimens.)

*To all whom it may concern:*

Be it known that I, EDWARD I. BRADDOCK, a citizen of the United States, residing in Medford, in the county of Middlesex and State of Massachusetts, have invented an Improvement in Insecticides, of which the following is a specification.

This invention relates to a novel composition for use as an exterminator of potato-bugs and other insects.

My present invention has for its object to provide an exterminator which is effective in killing the bugs in a comparatively short time without injury to the plants or vines and which also acts as a plant food.

In accordance with this invention I employ as the ingredients of my novel composition zinc carbonate and iron oxide, preferably ferric oxide, in equal proportions for the best results; but good results have been obtained with the proportion of the zinc carbonate as low as one-fourth.

The composition of equal parts of zinc carbonate and ferric oxide in powdered form is sprinkled on the potato or other vines and adheres thereto, so as not to be readily blown off and wasted, and forms a food which the bugs will eat without eating the leaves of the vines. The powder, composed of equal parts of zinc carbonate and iron oxide, is energetic in its action and kills the bugs in about four hours. The iron acts as a fertilizer for the plant or vine and serves also to attract the bugs to the powder so that they eat the powder rather than the vines.

I prefer to make the exterminator of equal parts of the carbonate of zinc and oxide of iron; but I do not desire to limit my invention in this respect, as these proportions may be varied, and good results have been obtained with the ingredients mixed in the proportions of one-fourth zinc carbonate to three-fourths iron oxide, and as the zinc carbonate is increased to about one-half the destructive action is hastened correspondingly; but owing to the lightness of the carbonate I have found it wasteful to employ the same in excess of the iron oxide, which serves, in addition to attracting the bugs and as a plant food, to impart to the composition the weight desired to cause it to tenaciously cling to the vines, and thus prevent it being readily blown off from the vines.

I claim—

An insecticide consisting of a composition of carbonate of zinc and oxide of iron, substantially as described.

In testimony whereof I have signed my name to this specification in the presence of two subscribing witnesses.

EDWARD I. BRADDOCK.

Witnesses:
JAS. H. CHURCHILL,
J. MURPHY.